US009914175B2

(12) United States Patent
Kato et al.

(10) Patent No.: US 9,914,175 B2
(45) Date of Patent: Mar. 13, 2018

(54) BORING MACHINE (75) Inventors: Tomoyasu Kato, Numazu (JP); Yutaka Asanome, Fuji (JP); Mamoru Akiyama, Fuji (JP)

(73) Assignee: TOSHIBA KIKAI KABUSHIKI KAISHA, Tokyo-To (JP)

( * ) Notice: Subject to any disclaimer, the term of this patent is extended or adjusted under 35 U.S.C. 154(b) by 651 days.

(21) Appl. No.: 14/235,345

(22) PCT Filed: Jul. 27, 2012

(86) PCT No.: PCT/JP2012/069245
§ 371 (c)(1),
(2), (4) Date: Apr. 3, 2014

(87) PCT Pub. No.: WO2013/015426
PCT Pub. Date: Jan. 31, 2013

(65) Prior Publication Data
US 2014/0216822 A1 Aug. 7, 2014

(30) Foreign Application Priority Data
Jul. 28, 2011 (JP) .................................. 2011-165638

(51) Int. Cl.
*B23B 29/02* (2006.01)
*B23B 29/034* (2006.01)
*B23Q 5/04* (2006.01)

(52) U.S. Cl.
CPC ........ *B23B 29/03489* (2013.01); *B23B 29/02* (2013.01); *B23B 29/034* (2013.01);
(Continued)

(58) Field of Classification Search
CPC . B23B 29/02; B23B 29/03489; B23B 29/034; B23Q 5/045; Y10T 408/91; Y10T 279/13; Y10T 279/14; Y10T 408/85
See application file for complete search history.

(56) References Cited

U.S. PATENT DOCUMENTS 2,223,041 A * 11/1940 Maxwell ............... B23B 29/034
408/154
2,231,511 A * 2/1941 Scott ..................... B23B 29/034
408/241 R
(Continued)

FOREIGN PATENT DOCUMENTS

DE  3515520 A1 * 10/1986 ........... B23C 31/265
EP  1099513 A1 * 5/2001 ............ B23Q 5/045
(Continued)

OTHER PUBLICATIONS

English Language Abstract and Translation for JP 2011-031357 dated Feb. 2, 2011.
(Continued)

*Primary Examiner* — Eric A Gates
(74) *Attorney, Agent, or Firm* — DLA Piper LLP (US)

(57) ABSTRACT

The invention is a boring machine including: a guide rail linearly extending in one direction; a main part slidably mounted on the guide rail; a sleeve extending from the main part in a plane substantially parallel to the guide rail; and a rotatable face plate mounted at a distal end of the sleeve; wherein a deflection-compensating wedge plate is provided between the distal end of the sleeve and the rotatable face plate.

15 Claims, 7 Drawing Sheets

(52) U.S. Cl.
CPC .............. *B23Q 5/045* (2013.01); *Y10T 279/14* (2015.01); *Y10T 408/85* (2015.01); *Y10T 408/91* (2015.01)

(56) References Cited

U.S. PATENT DOCUMENTS

| | | | | |
|---|---|---|---|---|
| 2,257,402 A | * | 9/1941 | Scott | B23B 29/034 408/147 |
| 2,263,085 A | * | 11/1941 | Guild | B23B 29/034 408/154 |
| 2,277,950 A | * | 3/1942 | Blood | B23B 29/034 408/241 R |
| 2,279,221 A | * | 4/1942 | Blood | B23B 29/034 408/241 R |
| 2,383,958 A | * | 9/1945 | De Vlieg | B23B 27/12 407/40 |
| 2,681,806 A | * | 6/1954 | Barrus | B23B 31/36 279/112 |
| 2,812,672 A | * | 11/1957 | Sainati | B23B 29/03478 279/6 |
| 2,916,951 A | * | 12/1959 | Carlson | B23B 29/034 408/11 |
| 3,007,353 A | * | 11/1961 | Garnett | B23B 29/034 408/147 |
| 3,461,752 A | * | 8/1969 | Kielas | B23B 29/03478 384/115 |
| 3,466,952 A | * | 9/1969 | Greenberg | B23B 29/034 384/114 |
| 3,622,247 A | * | 11/1971 | Greenberg | B23B 29/034 408/147 |
| 5,346,334 A | * | 9/1994 | Einaru | B23Q 9/0014 405/262 |
| 5,462,392 A | * | 10/1995 | Hardwick | B23B 47/287 408/110 |
| 5,971,682 A | * | 10/1999 | Vig | B23B 31/026 279/6 |
| 6,331,093 B1 | * | 12/2001 | Graham | B23B 29/02 408/1 R |
| 7,216,408 B2 | * | 5/2007 | Boyl-Davis | B23Q 9/0014 29/33 R |
| 8,727,677 B2 | * | 5/2014 | Sadaoka | B23B 27/10 408/1 R |
| 2011/0027028 A1 | * | 2/2011 | Sadaoka | B23B 27/10 408/1 R |

FOREIGN PATENT DOCUMENTS

| | | | |
|---|---|---|---|
| JP | H01-66914 | | 4/1989 |
| JP | 2002160111 A | * | 6/2002 |
| JP | 2011-031357 | | 2/2011 |
| JP | 2012-030344 | | 2/2012 |

OTHER PUBLICATIONS

English Language Abstract and Translation for JP 2012-030344 dated Feb. 16, 2012.
International Search Report issued in PCT/JP2012/069245 dated Aug. 21, 2012.
English Language Translation of International Search Report issued in PCT/JP2012/069245 dated Aug. 21, 2012.
International Preliminary Report on Patentability issued PCT/JP2012/069245 dated Jun. 20, 2013.
English Language Translation of International Preliminary Report on Patentability issued PCT/JP2012/069245 dated Jun. 20, 2013.

* cited by examiner

BORING MACHINE

CROSS REFERENCE TO RELATED APPLICATIONS

This application is a U.S. National Stage Application of International Application No. PCT/JP2012/069245 filed Jul. 27, 2012, which claims priority from Japanese Patent Application No. 2011-165638 filed Jul. 28, 2011. The entirety of all the above-listed applications are incorporated herein by reference.

FIELD OF THE INVENTION

The present invention relates to a boring machine. In particular, the present invention relates to a boring machine capable of carrying out a boring process to a large-sized work and capable of machining a surface perpendicular to an axis of a boring hole.

BACKGROUND ART

Figure 9:
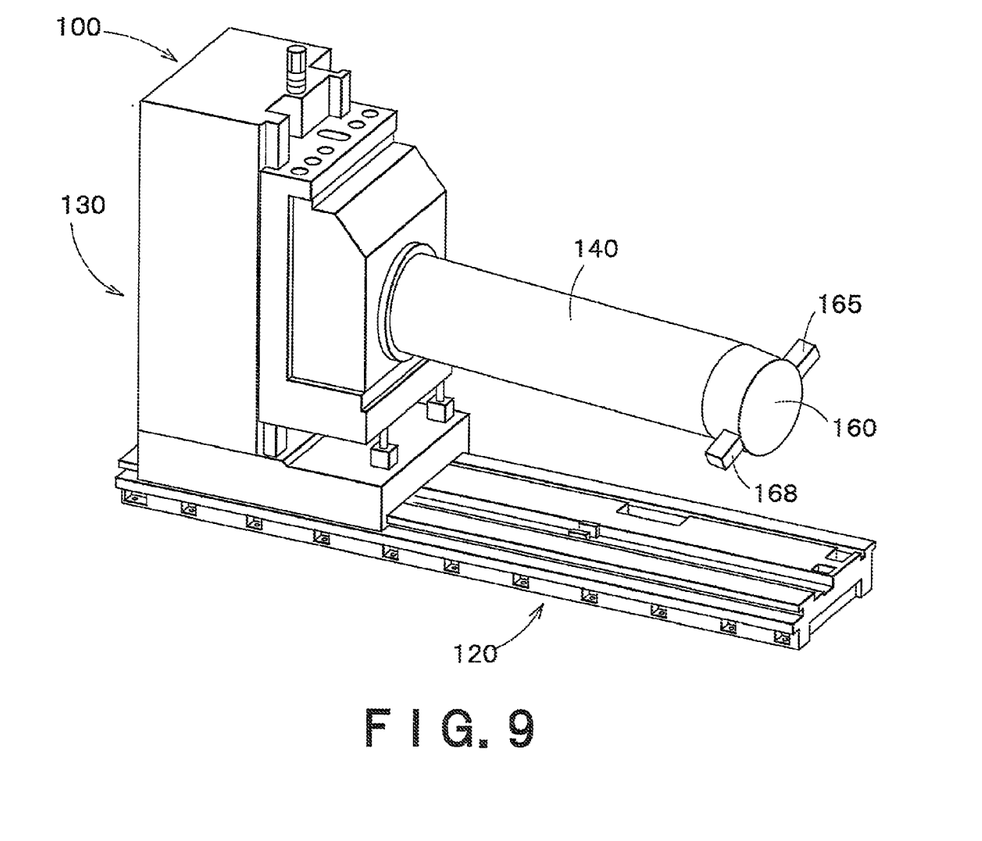
FIG. 9 is a schematic perspective view of a conventional boring machine.

FIG. 9 chows a conventional boring machine 100 for carrying out a boring process to a large-sized work. The boring machine 100 comprises a guide, rail 120 linearly extending in one direction, a main part 130 slidably mounted on the guide rail 120, a sleeve 140 extending from the main part 130 in a plane substantially parallel to the guide rail 120, and a rotatable face plate 160 mounted at a distal end of the sleeve 140.

A cutting tool 165 is mounted on the rotatable face plate 160. When the rotatable face plate 160 is rotated, the cutting tool 165 is also rotated, so that a boring process is carried out. Another cutting tool 158 is mounted on the rotatable face plate 160, on the opposite side of the cutting tool 165, in order to achieve a weight balance.

In addition, the cutting tool 165 is mounted on the rotatable face plate 160 preferably via a U-axis controlling mechanism which can extend and contract in a radial direction of the rotatable face plate 160. In this case, it is easy to machine a surface perpendicular to an axis of a boring hole, in a desired manner.

SUMMARY OF THE INVENTION

In the conventional boring machine 100 as shown in FIG. 9, the sleeve 140 is supported by the main part 130 in a cantilevered manner. Therefore, because of the gravity, the sleeve 140 is deflected although the degree of the deflection is slight (for example, about $\tan^{-1} (0.24/1000)$). Due to this deflection, a trajectory of the cutting tool 165 on the rotatable face plate 160 mounted at the distal end of the sleeve 140 is deflected from a vertical plane although the degree of the deflection is slight. Therefore, the conventional boring machine 100 cannot precisely machine a surface perpendicular to an axis of a boring hole while the main part 130 is moved along the guide rail 120 to carry out a boring process.

The present invention was accomplished in light of the above problems in the conventional art. An object of the invention is therefore to provide a boring machine that can precisely machine a surface perpendicular to an axis of a boring hole.

The present invention is a boring machine comprising: a guide rail linearly extending in one direction; a main part slidably mounted on the guide rail; a sleeve extending from the main part in a plane substantially parallel to the guide rail; and a rotatable face plate mounted at a distal end of the sleeve; wherein a deflection-compensating wedge plate is provided between the distal end of the sleeve and the rotatable face plate.

According to the present invention, a deflection of the sleeve can be compensated by means of the deflection-compensating wedge plate provided between the distal end of the sleeve and the rotatable face plate. Thus, the rotatable face plate can be aligned perpendicularly to an axis of a boring hole. Therefore, it is possible to precisely machine a surface perpendicular to an axis of a boring hole.

Preferably, the deflection-compensating wedge plate has a shape of an obliquely cut body of a right cylinder or a shape of an obliquely cut body of a polygonal prism. In such a shape, the cut angle (the inclined angle) is determined depending on a supposed amount of deflection of the sleeve.

In addition, preferably, the deflection-compensating wedge plate is provided such that a line connecting a thinnest part of the deflection-compensating wedge plate and a thickest part thereof is in alignment with a vertical direction. In this case, no deflection of the rotatable face plate is caused in a horizontal direction.

Alternatively, the deflection-compensating wedge plate may be provided such that a line connecting a thinnest part of the deflection-compensating wedge plate and a thickest part thereof makes a predetermined angle with a vertical direction. When the deflection-compensating wedge plate is set with such a suitable angle, it is possible to more precisely compensate the deflection of the sleeve. Herein, in order to make such adjustment possible, it is necessary to employ a maximum inclined angle of the deflection-compensating wedge plate (based on the thinnest part thereof and the thickest part thereof) larger than a supposed angle of the deflection of the sleeve. When the deflection-compensating wedge plate having such a maximum inclined angle is set with a suitable angle, any desired angle lower than the maximum inclined angle is available for the deflection compensation of the sleeve in the vertical direction.

Herein, when the deflection-compensating wedge plate is set with a suitable angle, there is generated a deflection in the angle in a horizontal plane (according to the planar view or the planar projection) of the rotational axis of the rotatable face plate with respect to the guide rail. In order to absorb this deflection, it is preferable that the angle in a horizontal plane of the sleeve with respect to the guide rail is changeable in the horizontal plane, depending on the interposed state of the deflection-compensating wedge plate. When this configuration is adopted, an angle in a horizontal plane or the rotatable face plate mounted at the distal end of the sleeve can be adjusted (compensated) with respect to the guide rail by changing the angle in the horizontal plane of the entire sleeve with respect to the guide rail.

Alternatively, it is preferable that the deflection-compensating wedge plate consists of a first half deflection-compensating wedge plate and a second half deflection-compensating wedge plate, both of which have the same inclined angle to each other, in this case, it is possible to compensate the deflection of the sleeve by means of each of the two half deflection-compensating wedge plates, which increases degree of freedom of adjustment operation.

In this case, preferably, the first half deflection-compensating wedge plate is provided such that a line connecting a thinnest part of the first half deflection-compensating wedge plate and a thickest part thereof is deflected by a predetermined angle in a clockwise direction from a vertical direction, and the second half deflection-compensating wedge plate is provided such that a line connecting a thinnest part of the second half deflection-compensating wedge plate and a thickest part thereof is deflected by the predetermined angle in a counterclockwise direction from the vertical direction. When this configuration is adopted, it is possible to avoid a deflection of the rotatable face plate in a horizontal direction, so that adjustment operation of the rotatable face plate in the horizontal direction is unnecessary.

EMBODIMENT OF THE INVENTION

With reference to the attached drawings, embodiments of the present invention are explained in detail hereinbelow.

Figure 1:
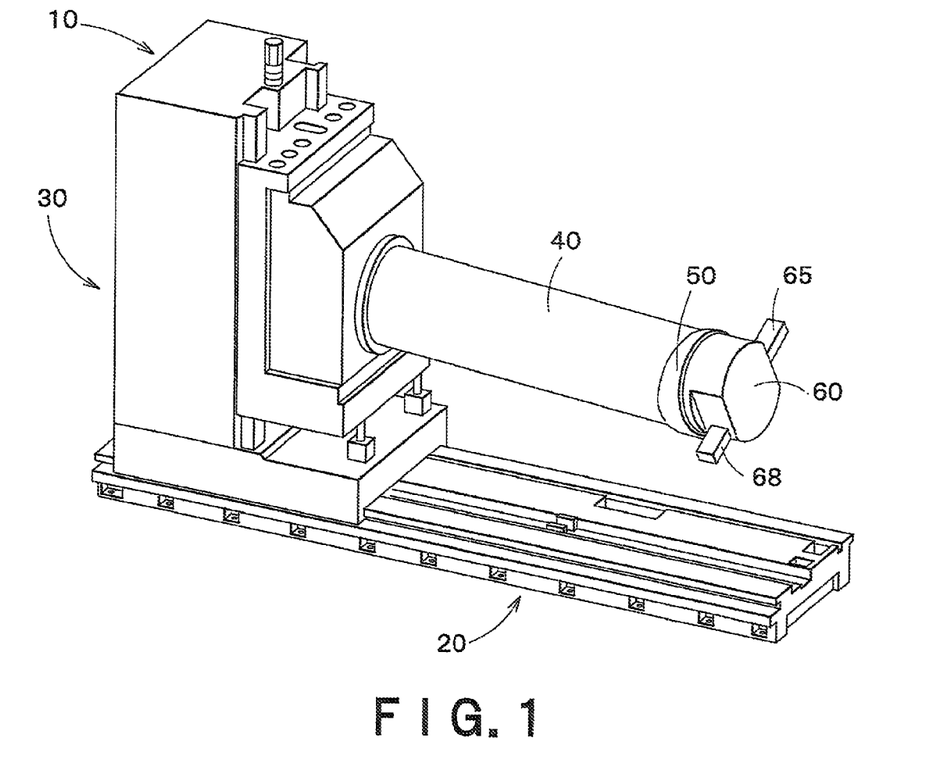
FIG. 1 is a schematic perspective view of a boring machine according to a first embodiment of the present invention.
Figure 2:
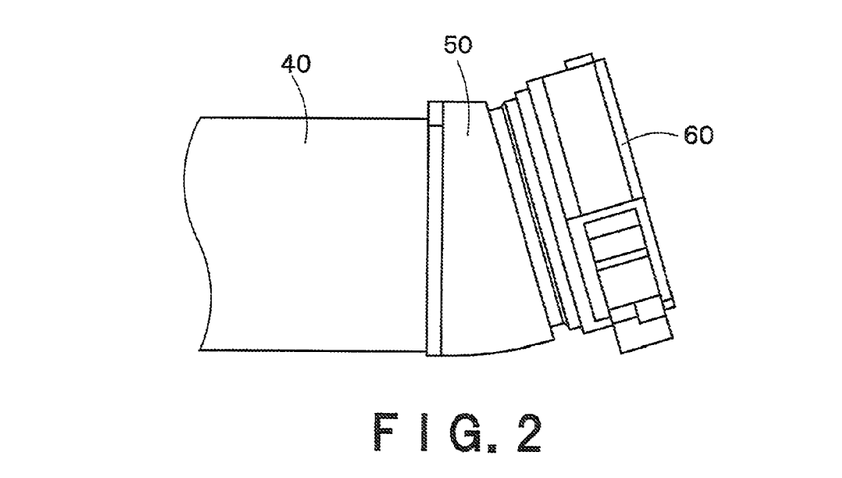
FIG. 2 is a schematic side view of the boring machine shown in FIG. 1, in a vicinity of a rotatable face plate thereof.
Figure 3:
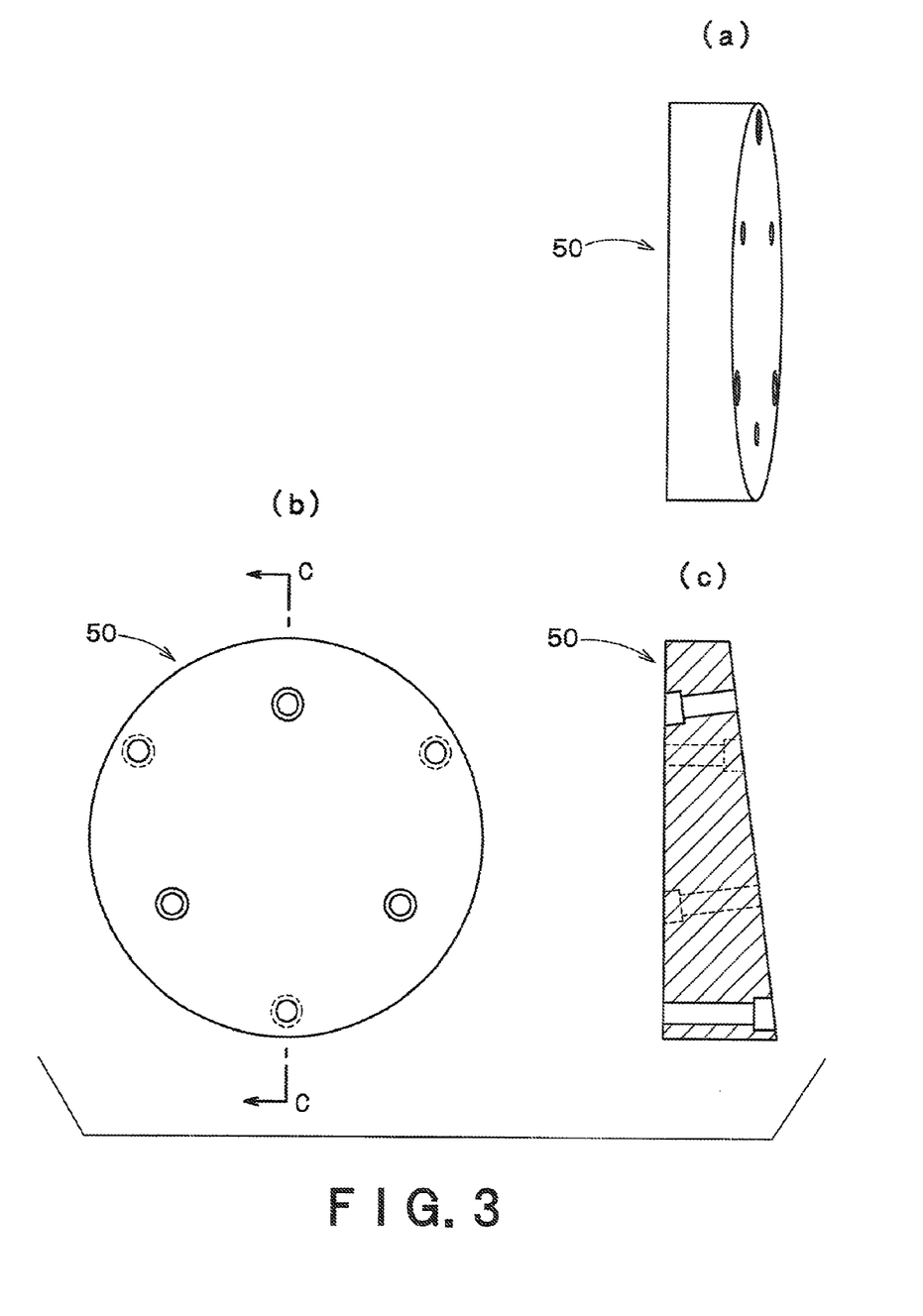
FIG. 3 is schematic views showing an example of a deflection-compensating wedge plate, wherein (a) is a plan view thereof, (b) is a front view thereof and (C) is a side view thereof.

FIG. 1 is a schematic perspective view of a boring machine according to a first embodiment of the present invention. FIG. 2 is a schematic side view of the boring machine shown in FIG. 1, in a vicinity of a rotatable face plate thereof. FIG. 3 is schematic views showing an example of a deflection-compensating wedge plate.

As shown in FIG. 1, a boring machine 10 of the present embodiment comprises a guide rail 20 linearly extending in one direction, a main part 30 slidably mounted on the guide rail 20, a sleeve 40 extending from the main part 30 in a plane substantially parallel to the guide rail 20, and a rotatable face plate 60 mounted at a distal end of the sleeve 40.

A cutting tool 65 is mounted on the rotatable face plate 60. When the rotatable face plate 60 is rotated, the cutting tool 65 is also rotated, so that a boring process is carried out.

Another cutting tool 68 is mounted on the rotatable face plate 60, on the opposite side of the cutting tool 65, in order to achieve a weight balance.

In addition, although not shown in detail, the cutting tool 65 is mounted on the rotatable face plate 60 via a U-axis controlling mechanism which can extend and contract in a radial direction of the rotatable face plate 60. Thus, it is easy to machine a surface perpendicular to an axis of a boring hole, in a desired manner.

As shown in FIGS. 1 and 2, the boring machine 10 of the present embodiment has a deflection-compensating wedge plate 50 between the distal end of the sleeve 40 and the rotatable face plate 60, which is the feature of the present invention.

Figure 4:
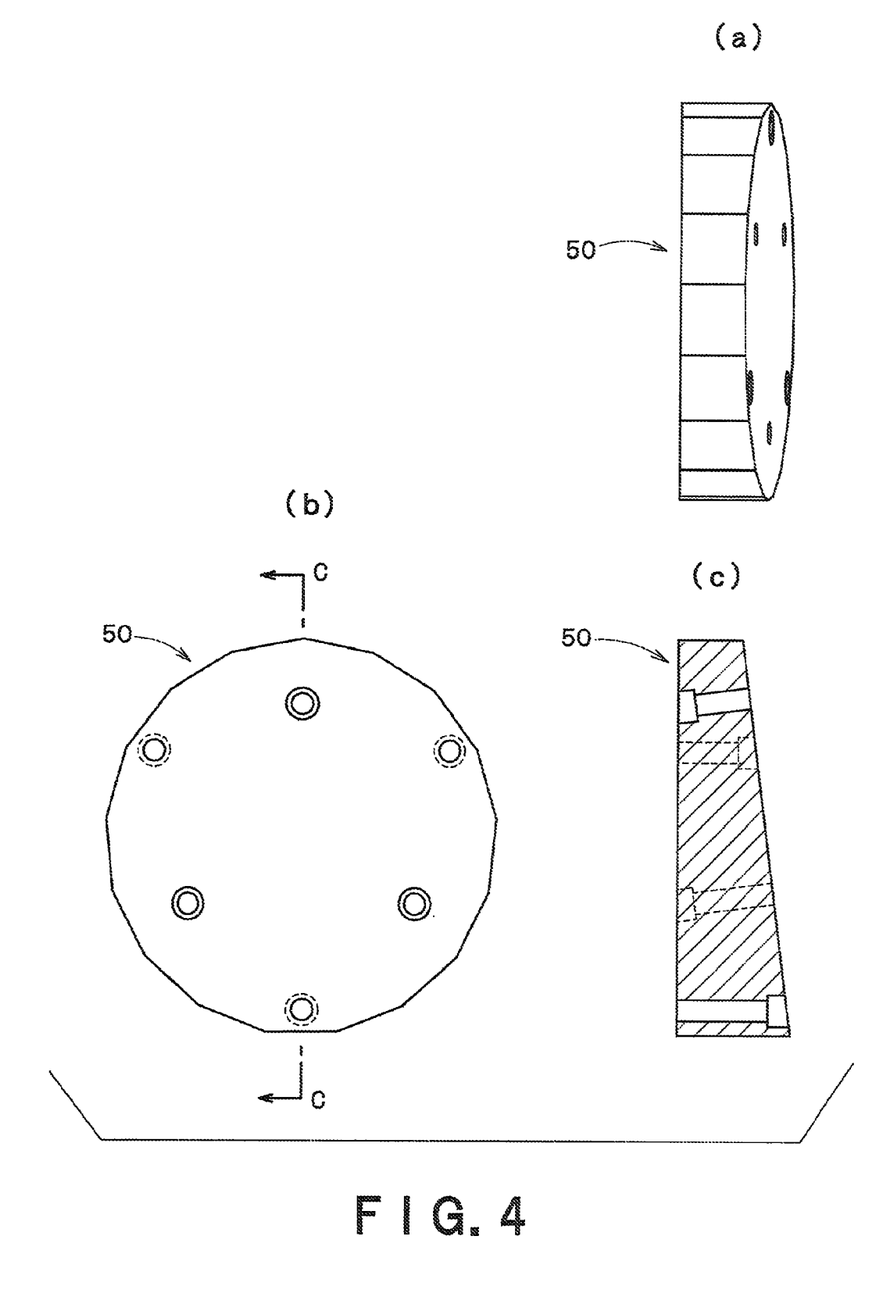
FIG. 4 is schematic views showing another example of the deflection-compensating wedge plate, wherein (a) is a plan view thereof, (b) is a front view thereof and (c) is a side view thereof.

As shown in FIGS. 2 and 3, the deflection-compensating wedge plate 50 is a member which has an attachment surface to be attached to the sleeve 40 and another attachment surface to be attached to the rotatable face plate 60 that is opposite to the former attachment surface. The deflection-compensating wedge plate 50 shown in FIG. 3 has a shape of an obliquely cut body of a right cylinder. Herein, as shown in FIG. 4, it is also possible to employ another deflection-compensating wedge plate that has a shape of an obliquely cut body of a polygonal prism. In these cases, the cut angle (inclined angle) is determined depending on a supposed amount of deflection of the sleeve 40, after the supposed amount of deflection of the sleeve 40 has been determined in advance by means of measurement or the like. In the drawings, the inclined angle of the deflection-compensating wedge plate 50 is exaggerated.

Various attachment measures that are publicly known per se can be adopted for the attachment of the deflection-compensating wedge plate 50 to the sleeve 40 and for the attachment of the deflection-compensating wedge plate 50 to the rotatable face plate 60. In the present embodiment, fixing by means of bolts is adopted. For example, a plurality of through holes is provided in the deflection-compensating wedge plate 50 for a plurality of fixing bolts, and a plurality of threaded holes is provided at corresponding positions in the sleeve 40 and the rotatable face plate 60.

As shown in FIG. 2, in the present embodiment, the diameter of the rotatable face plate 60 is smaller than that of the sleeve 40. Thus, at first, the deflection-compensating wedge plate 50 is attached to the rotatable face plate 60 by means of the fixing bolts. Then, the attached assembly is attached to the sleeve 40 by means of the fixing bolts.

Herein, as shown in FIG. 2, the deflection-compensating wedge plate 50 of the present embodiment is provided such that a line connecting a thinnest part of the deflection-compensating wedge plate 50 and a thickest part thereof is in alignment with a vertical direction. Thus, no deflection of the rotational axis of the rotatable face plate 60 is caused in a horizontal direction.

The boring machine 10 of the present embodiment, which has been assembled as shown in FIGS. 1 and 2, operates as follows.

The main body 30 slides and moves on the guide rail 20 such that the sleeve 40 is inserted into a prepared hole of an object (for example, a large-sized work), to which a boring process is to be carried out. Along with this insertion step, the rotatable face plate 60 is rotated so that the boring process is carried out by means of the cutting tool 65. Herein, it is preferable that the cutting tool 55 is subject to a U-axis control in accordance with a suitable NC control method. In addition, it is also possible to machine a surface perpendicular to an axis of the boring hole.

Herein, because of the existence of the deflection-compensating wedge plate 50, the deflection of the sleeve 40 is compensated. Thus, the cutting trajectory of the cutting tool 65 can be made precisely perpendicular to the axis of the boring hole. Therefore, it is possible to machine the surface perpendicular to the axis of the boring hole much precisely.

In addition, the deflection-compensating wedge plate 50 of the present embodiment is provided such that the line connecting the thinnest part thereof and the thickest part thereof is in alignment with the vertical direction. Thus, no deflection of the rotational axis of the rotatable face plate 60 is caused in a horizontal direction.

As described above, according to the present embodiment, the deflection of the sleeve 40 can be compensated by means of the deflection-compensating wedge plate 50 provided between the distal end of the sleeve 40 and the rotatable face plate 60. Thus, it is possible to precisely machine the surface perpendicular to the axis of the boring hole. In addition, no disadvantage is caused by providing the deflection-compensating wedge plate 50.

In the above embodiment, the inclined angle of the deflection-compensating wedge plate 50 is determined depending on the supposed amount of deflection of the sleeve 40, and the line connecting the thinnest part thereof and the thickest part thereof is in alignment with the vertical direction.

Figure 5:
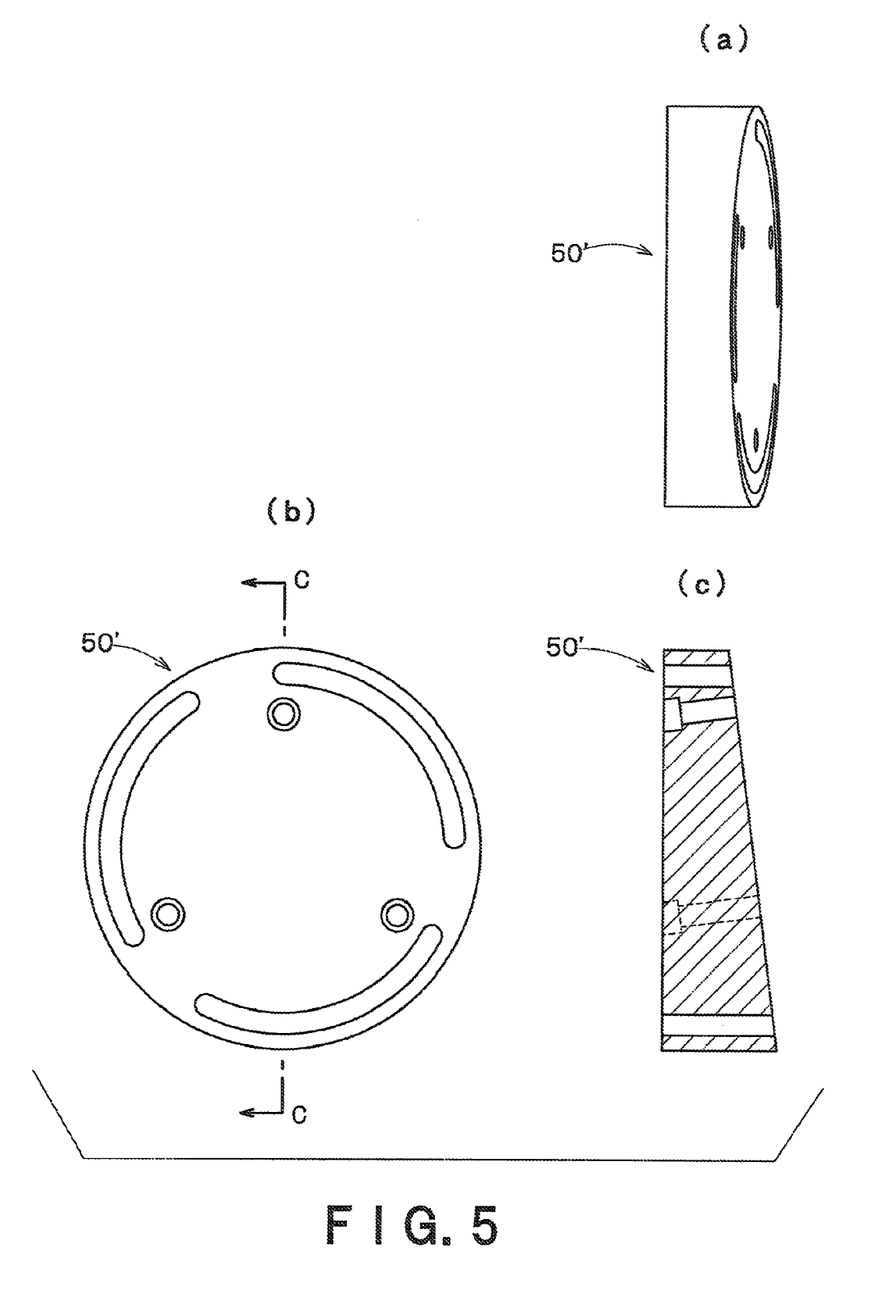
FIG. 5 is schematic views showing further another example of the deflection-compensating wedge plate, wherein (a) is a plan view thereof, (b) is a front view thereof and (c) is a side view thereof.

However, the deflection-compensating wedge plate 50' may be set with the line connecting the thinnest part thereof and the thickest part thereof making a predetermined angle with the vertical direction. When the deflection-compensating wedge plate 50' is set with such a suitable angle, it is possible to more precisely compensate the deflection of the sleeve 40.

Herein, in order to make such adjustment possible, it is necessary to employ a maximum inclined angle of the deflection-compensating wedge plate 50' (based on the thickest part thereof and the thinnest part thereof) larger than the supposed angle of the deflection of the sleeve 40. When the deflection-compensating wedge plate 50' having such a maximum inclined angle is set with a suitable angle, any desired angle lower than the maximum inclined angle is available for the deflection compensation of the sleeve 40 in the vertical direction.

In addition, in order to make such adjustment possible, it is necessary that the deflection-compensating wedge plate 50' is attachable to the sleeve 40 or the rotatable face plate 60 at any rotational angle. FIG. 5 is schematic views showing such an example of the deflection-compensating wedge plate.

In this example shown in FIG. 5 as well, fixing by means of bolts is adopted for the attachment of the deflection-compensating wedge plate 50' to the sleeve 40 and for the attachment of the deflection-compensating wedge plate 50' to the rotatable face plate 60. A plurality of through holes (each of which has a T-shaped section for housing a head part of the bolt) is provided in the deflection-compensating wedge plate 50' for a plurality of fixing bolts, and a plurality of threaded holes (substantially at regular intervals: only some of them are suitably used) is provided at corresponding positions in the sleeve 40 and the rotatable face plate 60. However, in the example shown in FIG. 5, the (outer) through holes for attaching the sleeve 40 are respectively formed as long arcuate holes. Because of these long arcuate holes, the deflection-compensating wedge plate 50' can be attached to the sleeve 40 with any desired rotation angle.

In the example shown in FIG. 5, the diameter of the rotatable face plate 60 is smaller than that of the sleeve 40.

Thus, at first, the deflection-compensating wedge plate 50' is attached to the rotatable face plate 60 by means of the fixing bolts. Then, the attached assembly is attached to the sleeve by means of the fixing bolts after adjustment of the rotational angle through the long arcuate holes.

Herein, when the deflection-compensating wedge plate 50' shown in FIG. 5 is set with a suitable angle, there is generated a deflection in the angle in a horizontal plane (according to the planar view or the planar projection) of the rotational axis of the rotatable face plate 60 with respect to the guide rail 20. In order to absorb this deflection, it is preferable that the angle in a horizontal plane of the sleeve 40 with respect to the guide rail 20 is changeable in the horizontal plane, depending on the interposed state of the deflection-compensating wedge plate 50'. An embodiment employing this structure is explained with reference to FIG. 6.

Figure 6:
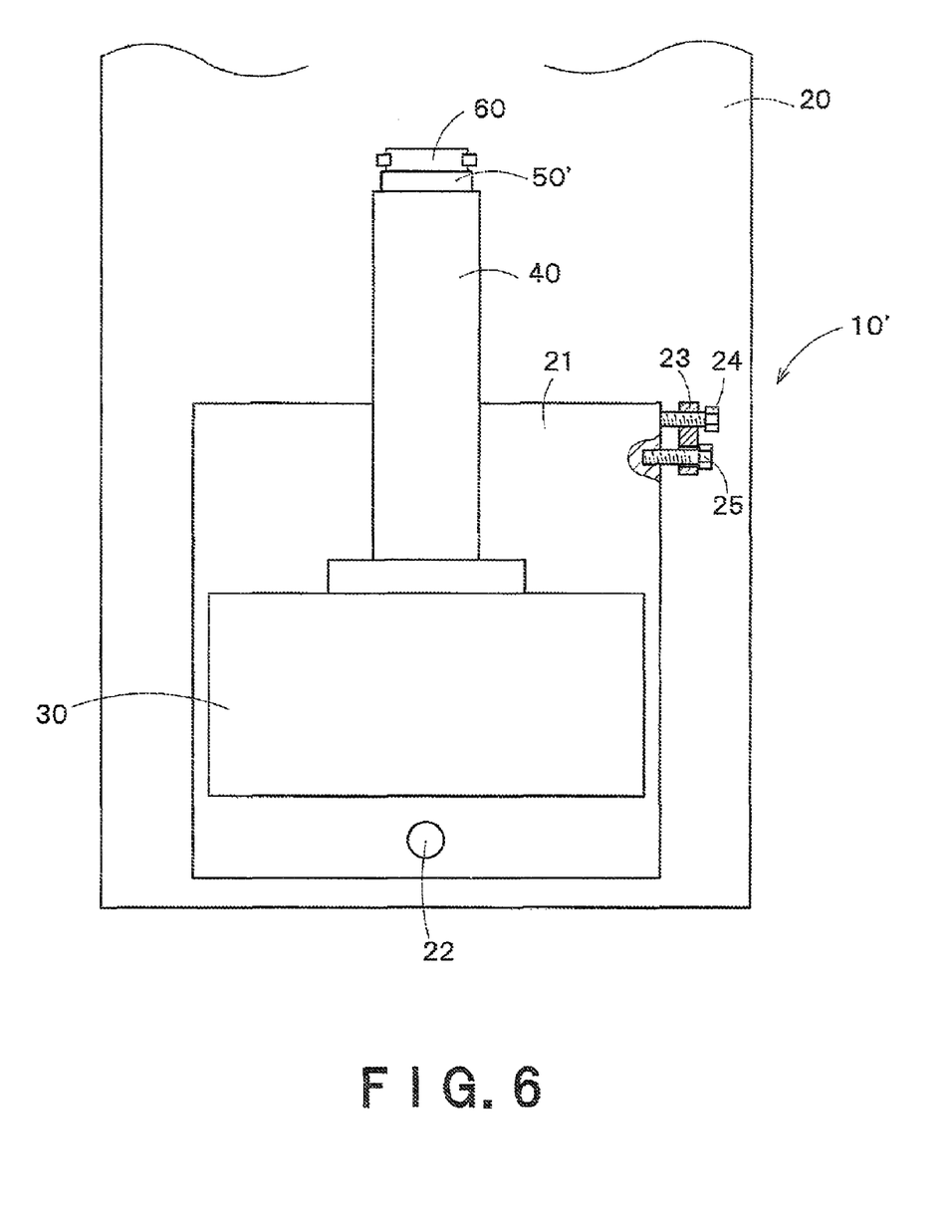
FIG. 6 is a schematic plan view of a boring machine according to a second embodiment of the present invention.

FIG. 6 is a schematic plan view of a boring machine according to a second embodiment of the present invention. As shown in FIG. 6, in the boring machine 10' according to the present embodiment, the main part 30 is set to the guide rail 20 via an attachment base 21 in order to change an angle of the sleeve 40 with respect to the guide rail 20 in a horizontal plane.

As shown in FIG. 6, the attachment base 21 is set to the guide rail 20 in such a manner that the attachment base 21 can pivot about a fulcrum pin 22. The pivotal position of the attachment base 21 is determined to a desired position by means of a positioning block 23, a positioning bolt 24 and another positioning bolt 25. When the respective bolts 24, 25 are rotated (moved) with respect to the positioning block 23, the pivotal position of the attachment base 21 about the fulcrum pin 22 can be adjusted.

If this configuration is adopted, when the deflection-compensating wedge plate 50' is set with a suitable angle and when a deflection in the angle in the horizontal plane of the rotational axis of the rotatable face plate 60 with respect to the guide rail 20 is generated, the respective bolts 24, 25 are rotated and the pivotal position of the attachment base 21 about the fulcrum pin 22 is adjusted, in order to compensate the deflection. Thus, the main part 30 and the sleeve 40 are dislocated from (the extending direction of) the guide rail 20, so that the deflection in the angle in the horizontal plane of the rotational axis of the rotatable face plate 60 can be compensated with respect to the guide rail 20.

Figure 7:
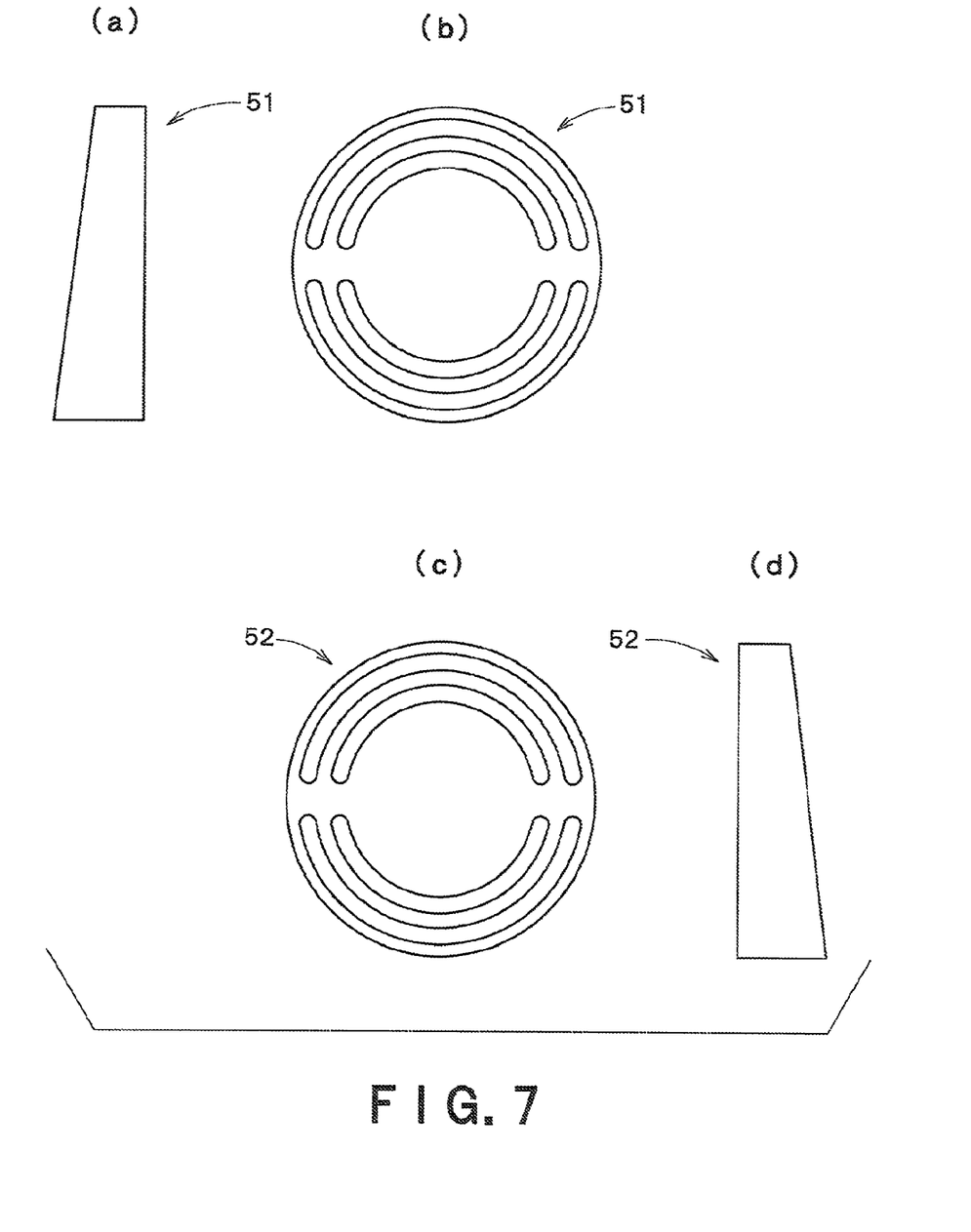
FIG. 7 is schematic views showing further another example of the deflection-compensating wedge plate, which consists of a first half deflection-compensating wedge plate and a second half deflection-compensating wedge plate, wherein (a) is a side view of the first half deflection-compensating wedge plate, (b) is a front view of the first half deflection-compensating wedge plate, (c) is a front view of the second half deflection-compensating wedge plate and (d) is a side view of the second half deflection-compensating wedge plate.
Figure 8:
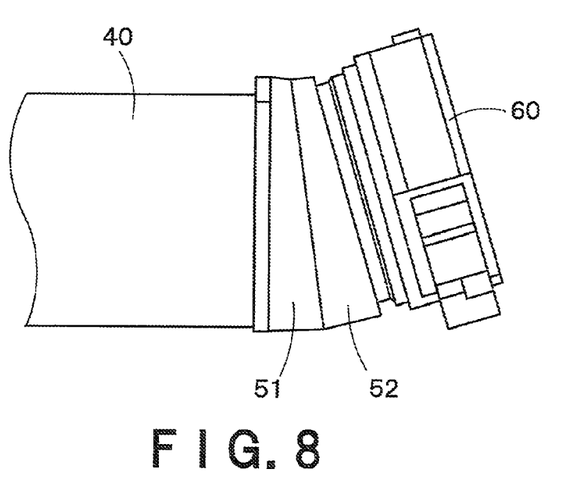
FIG. 8 is a schematic side view of a vicinity of a rotatable face plate in a case wherein the deflection-compensating wedge plate shown in FIG. 7 is employed.

Next, FIG. 7 is schematic views showing further another example of the deflection-compensating wedge plate, which consists of a first half deflection-compensating wedge plate 51 and a second half deflection-compensating wedge plate 52, wherein (a) is a side view of the first half deflection-compensating wedge plate, (b) is a front view of the first half deflection-compensating wedge plate, (C) is a front view of the second half deflection-compensating wedge plate and (d) is a side view of the second half deflection-compensating wedge plate. FIG. 8 is a schematic side view of a vicinity of a rotatable face plate in a case wherein the deflection-compensating wedge plate shown in FIG. 7 is employed.

In the example shown in FIGS. 7 and 8, the deflection-compensating wedge plate consists of the first half deflection-compensating wedge plate 51 and the second half deflection-compensating wedge plate 52 both of which have the same inclined angle (maximum inclined angle) to each other. In this case, it is possible to compensate the deflection of the sleeve 40 by means of each of the two half deflection-compensating wedge plates 51, 52, which increases degree of freedom of adjustment operation.

In this case, preferably, the first half deflection-compensating wedge plate 51 is provided such that a line connecting a thinnest part of the first half deflection-compensating wedge plate 51 and a thickest part thereof is deflected by a predetermined angle in a clockwise (or counterclockwise) direction from a vertical direction, and the second half deflection-compensating wedge plate 52 is provided such that a line connecting a thinnest part of the second half deflection-compensating wedge plate 52 and a thickest part thereof is deflected by the predetermined angle in a counterclockwise (or clockwise) direction from the vertical direction. When this configuration is adopted, it is possible to avoid a deflection of the rotational axis of the rotatable face plate 60 in a horizontal direction, so that adjustment operation of the rotatable face plate 60 in the horizontal direction is unnecessary. That is to say, it is unnecessary to provide the function or structure explained with reference to FIG. 6.

In this example shown in FIGS. 7 and 8 as well, fixing by means of bolts is adopted for the attachment of the respective half deflection-compensating wedge plates 51, 52 to the sleeve and for the attachment of the respective half deflection-compensating wedge plates 51, 52 to the rotatable face plate 60. A plurality of through holes (each of which has a T-shaped section for housing a head part of the bolt) is provided in the respective deflection-compensating wedge plates 51, 52 for a plurality of fixing bolts, and a plurality of threaded holes (substantially at regular intervals: only some of them are suitably used) is provided at corresponding positions in the sleeve 40 and the rotatable face plate 60. However, in the example shown in FIGS. 7 and 8, the through holes of the respective deflection-compensating wedge plates 51, 52 are respectively formed as long arcuate holes. Because of these long arcuate holes, the respective deflection-compensating wedge plates 51, 52 can be attached to the sleeve 40 and the rotatable face plate 60 with any desired rotation angle.

In the example shown in FIGS. 7 and 8, the diameter of the rotatable face plate 60 is smaller than that of the sleeve 40. Thus, at first, the respective deflection-compensating wedge plates 51, 52 are attached to the rotatable face plate 60 by means of the fixing bolts, in such a manner that the respective lines connecting the respective thinnest parts thereof and the respective thickest parts thereof are in alignment with each other to provide a maximum inclined angle). Then, the attached assembly is temporarily attached to the sleeve 40 while the rotational angle is adjusted through the long arcuate holes. Then, one of the first deflection-compensating wedge plate 51 and the second deflection-compensating wedge plate 52 is rotated in the opposite direction from the vertical direction by the same angle as the above temporarily-attached rotational angle (the other of the first deflection-compensating wedge plate 51 and the second deflection-compensating wedge plate 52 is maintained at the above temporarily-attached rotational angle). Under this situation, the final attachment (fixing) by means of the bolts is carried out.

The invention claimed is:

1. A boring machine comprising
a guide rail linearly extending in one direction;
a main part slidably mounted on the guide rail;
a sleeve extending from the main part in a plane substantially parallel to the guide rail;
a rotatable face plate mounted at a distal end of the sleeve; wherein
a deflection-compensating wedge plate is provided between the distal end of the sleeve and the rotatable face plate, the deflection-compensating wedge plate comprising a first attachment surface configured to be attached to the sleeve and a second attachment surface configured to be attached to the rotatable face plate,
the first attachment surface and the second attachment surface are non-parallel;
an angle between the first attachment surface and the second attachment surface is determined depending on a supposed amount of deflection of the sleeve,
the deflection-compensating wedge plate and the sleeve are attached to each other by a first attachment measure,
the deflection-compensating wedge plate and the rotatable face plate are attached to each other by a second attachment measure, and
the sleeve and the rotatable face plate, which are not directly attached to each other, are attached to each other through the deflection-compensating wedge plate.

2. The boring machine according to claim 1, wherein
the deflection-compensating wedge plate has a shape of an obliquely cut body of a right cylinder.

3. The boring machine according to claim 2, wherein
the deflection-compensating wedge plate is arranged such that a line connecting a thinnest part of the deflection-compensating wedge plate and a thickest part of the deflection-compensating wedge plate is in alignment with a vertical direction.

4. The boring machine according to claim 2, wherein
the deflection-compensating wedge plate is arranged such that a line connecting a thinnest part of the deflection-compensating wedge plate and a thickest part of the deflection-compensating wedge plate makes a predetermined angle with a vertical direction.

5. The boring machine according to claim 4, wherein
an angle in a horizontal plane of the sleeve with respect to the guide rail is changeable in the horizontal plane, depending on an interposed state of the deflection-compensating wedge plate, by pivoting the main part relative to the guide rail in the horizontal plane.

6. The boring machine according to claim 1, wherein
the deflection-compensating wedge plate has a shape of an obliquely cut body of a polygonal prism.

7. The boring machine according to claim 6, wherein
the deflection-compensating wedge plate is arranged such that a line connecting a thinnest part of the deflection-compensating wedge plate and a thickest part of the deflection-compensating wedge plate is in alignment with a vertical direction.

8. The boring machine according to claim 6, wherein
the deflection-compensating wedge plate is arranged such that a line connecting a thinnest part of the deflection-compensating wedge plate and a thickest part of the deflection-compensating wedge plate makes a predetermined angle with a vertical direction.

9. The boring machine according to claim 8, wherein
an angle in a horizontal plane of the sleeve with respect to the guide rail is changeable in the horizontal plane, depending on an interposed state of the deflection-compensating wedge plate, by pivoting the main part relative to the guide rail in the horizontal plane.

10. The boring machine according to claim 1, wherein
the deflection-compensating wedge plate is arranged such that a line connecting a thinnest part of the deflection-compensating wedge plate and a thickest part of the deflection-compensating wedge plate is in alignment with a vertical direction.

11. The boring machine according to claim 1, wherein
the deflection-compensating wedge plate is arranged such that a line connecting a thinnest part of the deflection-compensating wedge plate and a thickest part of the deflection-compensating wedge plate makes a predetermined angle with a vertical direction.

12. The boring machine according to claim 11, wherein
an angle in a horizontal plane of the sleeve with respect to the guide rail is changeable in the horizontal plane, depending on an interposed state of the deflection-compensating wedge plate, by pivoting the main part relative to the guide rail in the horizontal plane.

13. The boring machine according to claim 1, wherein
the deflection-compensating wedge plate comprises a first half deflection-compensating wedge plate and a second half deflection-compensating wedge plate, both of which have the same inclined angle to each other.

14. The boring machine according to claim 13, wherein
the first half deflection-compensating wedge plate is arranged such that a line connecting a thinnest part of the first half deflection-compensating wedge plate and a thickest part of the first half deflection-compensating wedge plate is deflected by a predetermined angle in a clockwise direction from a vertical direction, and the second half deflection-compensating wedge plate is arranged such that a line connecting a thinnest part of the second half deflection-compensating wedge plate and a thickest part of the second half deflection-compensating wedge plate is deflected by the predetermined angle in a counterclockwise direction from the vertical direction.

15. The boring machine according to claim 1, wherein
a cutting tool, which protrudes from the rotatable face plate in a substantially radial direction of the rotatable face plate, is mounted on the rotatable face plate via a U-axis controlling mechanism which can extend and retract in a radial direction of the rotatable face plate.

* * * * *